(12) United States Patent
Nyberg

(10) Patent No.: US 12,407,791 B2
(45) Date of Patent: Sep. 2, 2025

(54) VISUAL FEEDBACK FOR VIDEO MUTED PARTICIPANTS IN AN ONLINE MEETING

(71) Applicant: Cisco Technology, Inc., San Jose, CA (US)

(72) Inventor: Cato Nyberg, Hosle (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 313 days.

(21) Appl. No.: 17/942,457

(22) Filed: Sep. 12, 2022

(65) Prior Publication Data
US 2024/0089408 A1    Mar. 14, 2024

(51) Int. Cl.
| | |
|---|---|
| *H04N 7/15* | (2006.01) |
| *G06F 3/04817* | (2022.01) |
| *G06T 13/40* | (2011.01) |
| *G06V 40/16* | (2022.01) |
| *H04L 12/18* | (2006.01) |

(52) U.S. Cl.
CPC ......... *H04N 7/152* (2013.01); *G06F 3/04817* (2013.01); *G06T 13/40* (2013.01); *G06V 40/176* (2022.01); *H04L 12/1822* (2013.01)

(58) Field of Classification Search
CPC ........ H04N 7/152; H04N 7/147; H04N 7/157; H04N 7/15; G06F 3/04817; G06F 3/04842; G06T 13/40; G06V 40/176; G06V 20/40; G06V 40/174; G06V 40/16; H04L 12/1822; H04L 51/10; H04L 12/1827; H04L 12/18
See application file for complete search history.

(56) References Cited

U.S. PATENT DOCUMENTS

| | | | |
|---|---|---|---|
| 2017/0302709 A1* | 10/2017 | Jones | G06Q 10/10 |
| 2018/0331842 A1 | 11/2018 | Faulkner et al. | |
| 2019/0172243 A1 | 6/2019 | Mishra et al. | |
| 2020/0099890 A1 | 3/2020 | Tanaka et al. | |
| 2020/0293765 A1* | 9/2020 | Bryant, III | G06V 40/175 |
| 2022/0070628 A1* | 3/2022 | Frolovichev | H04W 4/12 |

FOREIGN PATENT DOCUMENTS

CN    111063339 A    4/2020

OTHER PUBLICATIONS

Ramasubramanian, et al., Loom.ai Joins Roblox, "Real-time 3D Avatars for Enterprise", https://loomai.com/news, retrieved Jun. 28, 2022, 1 page.

Yepic Studio, "Imagine a world where everyone could speak, and be understood in any nyelv," https://www.vidvoice.ai/, Jun. 28, 2022, 10 pages.

(Continued)

*Primary Examiner* — Yosef K Laekemariam
(74) *Attorney, Agent, or Firm* — Edell, Shapiro & Finnan, LLC

(57) ABSTRACT

One or more animated files are generated using an image of a user and stored in a data store associated with the user. It is determined that the user is participating in an online meeting and the user is not transmitting video. The one or more animated files are obtained from the data store and transmitted for display playback on a loop on devices of participants participating in the online meeting with the user when the user is not transmitting video.

20 Claims, 6 Drawing Sheets

(56) References Cited

OTHER PUBLICATIONS

NVIDIA Newsroom, NVIDIA Announces Platform for Creating AI Avatars, "NVIDIA Omniverse Avatar Enables Real-Time Conversational AI Assistants", https://nvidianews.nvidia.com/news/nvidia-announces-platform-for-creating-ai-avatars, published Nov. 9, 2021, 11 pages.

Lyons, The Verge, "New AI 'Deep Nostalgia' brings old photos, including very old ones, to life", https://www.theverge.com/2021/2/28/22306097/ai-brings-still-photos-life-meme-twitter-geneaology-myheritage, published Feb. 28, 2021, 6 pages.

Fisert, et al., "Analyzing Facial Expressions for Virtual Conferencing," Telecommunications Laboratory, University of Erlangen, IEEE Computer Graphics & Applications, Sep. 1998, 11 pages.

\* cited by examiner

VISUAL FEEDBACK FOR VIDEO MUTED PARTICIPANTS IN AN ONLINE MEETING

TECHNICAL FIELD

The present disclosure relates to online video meetings/conferences.

BACKGROUND

Although audio may be considered the most important media in multimedia conference calls, visual feedback is also important. However, some people are not always comfortable sharing video, especially in medium or large conferences or when a person is not directly contributing to a conversation. If a user has uploaded a picture, other participants may get a feeling of presence and an idea of who the user is. However, a static photograph of the user can be non-informative and does not give any feedback of the user's reactions during the online meeting.

DETAILED DESCRIPTION

Overview

Figure 1:
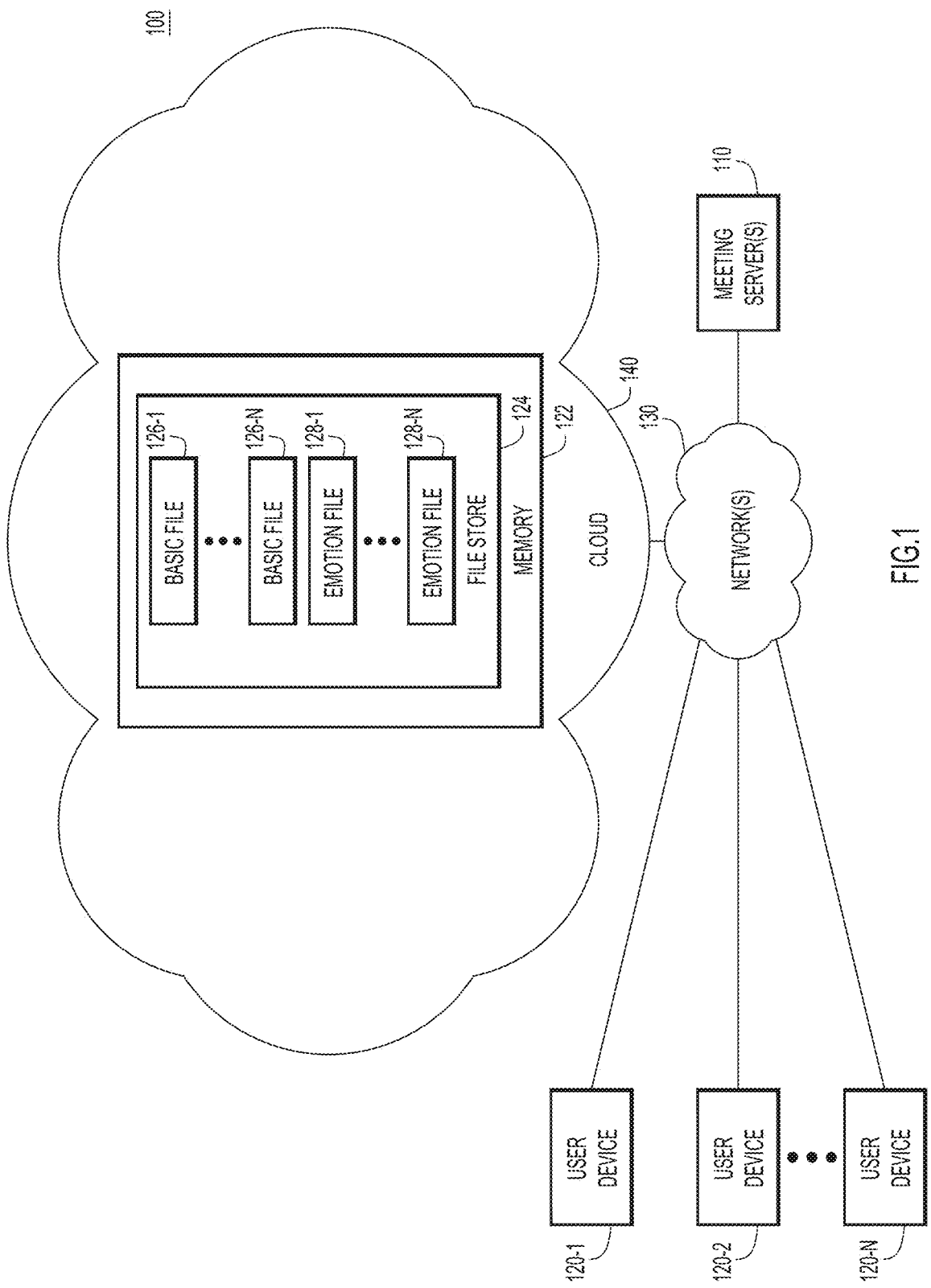
FIG. 1 is a block diagram of an online video conference/meeting system configured to support providing visual feedback for video muted participants, according to an example embodiment.

In one embodiment, a computer-implemented method is provided for improving a visual feedback of video muted participants in an online meeting or communication session. The method includes generating one or more animated files using an image of a user and storing the one or more animated files in a data store associated with the user. It is determined that a user is participating in an online meeting and the user is not transmitting video. The one or more animated files are obtained from the data store and transmitted for display playback on a loop on devices of participants participating in the online meeting with the user when the user is not transmitting video.

Example Embodiments

Artificial Intelligence (AI) and machine learning (ML) technologies have been used to create animations of still pictures in which the still pictures appear to be transformed into "live videos." Using AI and ML technologies, photos taken from any camera may be "brought to life" by using pre-recorded driver videos of facial movements and applying the pre-recorded driver video that works the best for a particular still photo. The processed still photos appear to show people in action by animating the people so that the people, for example, move their heads, blink their eyes, smile, laugh, etc.

Embodiments described herein provide for animating pictures of people during an online meeting or communication session for improved video feedback. Embodiments described herein create a more dynamic scene in a conference setting by animating a user's current profile photo. In particular, one or more basic animated files may be created using the user's profile photo by animating the profile photo so that, for example, the user's head moves, the user's eyes blink, the user smiles, etc. In addition, several emotion animated files may be created using the user's profile photo. Each emotion animated file may be associated with a different emotion or reaction. For example, a nodding animated file may be created from the user's profile photo in which the user's head nods. As another example, a laughing animated file may be created from the user's profile photo in which the user appears to laugh.

In one embodiment, the one or more basic animated files may be played on a loop when the user is not transmitting video to create an illusion that the picture of the user is a real person and not merely a still image. In another embodiment, an emotion animated file may be played in response to obtaining a trigger received from a user. The trigger may be obtained, for example, using face or gesture detection or from receiving an input from a user (e.g., when the user selects a reaction button). The animated emotion files may provide an indication that the user is engaged in and reacting to the online communication session.

In addition, embodiments described herein provide conference participants with a more vibrant grid view. For example, instead of viewing a grid of still pictures or initials of users' names, the grid view may show photos of participants with slight movement/animation to the photos. Instead of mimicking every move or expression of the participants, embodiments described herein create an illusion that a user is viewing a group of real people and not just still images. In addition, a user may be able to detect visual feedback from other participants when the participants trigger animated emotion files to, for example, show approval (e.g., by nodding) or amusement (e.g., by smiling/laughing).

Reference is first made to FIG. 1. FIG. 1 shows a block diagram of a system 100 that is configured to provide improved visual feedback of video muted participants in an online meeting. The system 100 includes one or more meeting server(s) 110 and a plurality of user devices 120-1 to 120-N (sometimes referred to herein individually as user device 120 or collectively as user devices 120) that communicate with meeting server(s) 110 and cloud 140 via one or more networks 130.

The meeting server(s) 110 are configured to provide an online meeting service for hosting a communication session among user devices 120-1 to 120-N. In some embodiments, the meeting server(s) 110 may generate animated files based on images/pictures/photographs of users. As described further below, the meeting server(s) 110 may additionally transmit different animated files to participants in an online meeting based on triggers received from user devices 120-1 to 120-N.

The user devices 120-1 to 120-N may be tablets, laptop computers, desktop computers, Smartphones, virtual desktop clients, or any user device now known or hereinafter developed that can run a meeting client or similar communication functionality. The user devices 120-1 to 120-N may have a dedicated physical keyboard or touch-screen capabilities to provide a virtual on-screen keyboard to enter text. The network(s) 130 may include wired local and wide-area networks as well as wireless local and wide-area networks. The user devices 120-1 to 120-N may also have short-range wireless system connectivity (such as Bluetooth™ wireless system capability, ultrasound communication capability, etc.) to enable local wireless connectivity with a videoconference endpoint in a meeting room or with other user devices in the same meeting room. In some embodiments, user devices 120-1 to 120-N may be videoconference endpoints, such as a personal videoconference endpoint.

Cloud 140 may include a memory 122 that includes a file store 124. File store 124 may store animated files associated with different users/participants, such as users of user devices 120-1 to 120-N. File store 124 may store basic files 126-1 to 126-N (sometimes referred to herein individually as basic file 126 and collectively as basic files 126) and emotion files 128-1 to 128-N (sometimes referred to herein individually as emotion file 128 and collectively as emotion files 128). In some embodiments, each user/participant may be associated with one or more basic files 126. In other embodiments, each user/participant may additionally be associated with a plurality of emotion files 128.

Meeting server(s) 110 or another device may create one or more animated files for a user based on the user's profile picture using one or more ML models and/or AI technologies. The user's profile picture may be, for example, a photograph of the user, a cartoon avatar of the user, a picture/drawing that is not of the user (e.g., a cat, a dog, etc.), etc. A user may upload the profile picture for a user profile, a profile picture may automatically be uploaded from a company directory, or the meeting system may obtain the user profile from other sources (e.g., social media services). The animated files created from the profile pictures may be GIFs or other types of files that are video representations of the users based on the users' profile pictures. Each animated file may be short in duration (e.g., a few seconds long). A basic animated file (such as one of the basic files 126-1 to 126-N) may be created based on the profile picture in which the user appears to make subtle movements in a neutral manner. For example, when the profile picture is a photograph or image of the user, the user's head may move slightly, the user's eyes may blink, etc., while the user maintains a neutral expression. In some embodiments, more than one basic animated file may be created for each user. In this embodiment, each basic animated file may show the user making different subtle movements. Other types of profile pictures (e.g., a cartoon, an animal) may be animated in a similar manner.

The basic file(s) 126 may be created using an AI model and in a way that is a natural loop, which limits size and computational load. The user may have a common expression at the beginning and the end of the basic file 126, so that the looping of the basic file 126 is smooth and relatively undetectable. In addition, when more than one basic file 126 is created for a user, each basic file 126 has the same common expression at the beginning and end so that switching between basic files 126 is smooth and seamless. In this embodiment, the basic files 126 may be played in random order to break any repetitive appearance. Each basic file 126 may be associated with a user identifier corresponding to the user and a file identifier associated with the basic file 126.

In addition to the basic file(s) 126, one or more emotion animated files (such as emotion files 128-1 to 128-N) may be generated using the user's profile picture. Each emotion file 128 may be associated with a different reaction or emotion. For example, one emotion file 128 may be associated with agreement and may show the user nodding in agreement. Another emotion file 128 may be associated with amusement and may show the user smiling or laughing. Each emotion file 128 may be relatively short and the user may have a common start/stop expression in each emotion file. The common start/stop expression may be the same as the common start/stop expression in the basic file(s) 126, which makes for seamless transitions between emotion files 128 or between an emotion file 128 and a basic file 126. Each emotion file 128 may be associated with a user identifier indicating the user depicted in the file and an emotion identifier associated with the emotion or reaction corresponding to the emotion file 128.

In one embodiment, during a videoconference/multimedia session in which a user is not transmitting video, meeting server(s) 110 may obtain the animated files from file store 124 and transmit the animated files as the video of the user. In this embodiment, meeting server(s) 110 may download the animated files for one or more participants of an online meeting from cloud 140 at the beginning of the online meeting. The meeting server(s) 110 may determine that one or more of the participants wish to transmit their basic file(s) 126 and, optionally, one or more emotion files 128 in place of transmitting video (e.g., when the participants have their videos muted, based on an input from the participants, etc.) and the meeting server(s) 110 may transmit the animated files to the other participants during the meeting. In some embodiments, the meeting server(s) may use the animated files as a source (e.g., instead of camera images), which is encoded and sent to the participants of the online meeting as a video stream. In other embodiments, the animated files may be transmitted to the participants.

In another embodiment, the animated files may be stored locally on each participant's device/client and the device/client may transmit the animated files as the video of the user. For example, each user device 120-1 to 120-N may obtain the animated files for the user of the user device 120 from cloud 140 at the beginning of an online meeting/videoconference (e.g., automatically at the beginning of each online meeting/videoconference or in response to a selection by a user, such as a user selecting a video mute option). In other embodiments, user devices 120-1 to 120-N may store the animated files and the user device 120 does not download the animated files from cloud 140 at the beginning of each videoconference. In some embodiments, user devices 120-1 to 120-N may have integrated animation generators and the user devices 120-1 to 120-N may generate the animated files for the user. In these embodiments, the animation generators may access third party AI/ML models to generate the animated files and upload the animated files to user devices 120-1 to 120-N.

When the animated files are stored at a user device 120, the user device 120 may determine that the user wishes to transmit the animated files instead of a video and the user device 120 may transmit basic file(s) 126 and, optionally, one or more of the emotion files 128 during the online meeting. The user device 120 may use the animated files as a source that is encoded and transmitted to the participants of the online meeting as a video stream or the user device 120 may transmit the animated files to the participants. In some embodiments, the user device 120 may determine that the animated files are to be transmitted as the video of the user when the user's video is turned off/muted or the user has closed the camera lens cover. In other embodiments, the user device 120 may determine that the animated files are to be transmitted as video based on an indication or selection from the user.

In other embodiments, for small/medium teleconferences, each participating user device 120-1 to 120-N may fetch basic files 126-1 to 126-N and emotion files 128-1 to 128-N for other participants in the teleconference from cloud 140 and render the animated files locally. In this situation, a user device 120 may receive an indication (e.g., from meeting server(s) 110 or other user devices 120-1 to 120-N) that one or more participants wish to display the animated files instead of video and user device 120 may display the animated files for those participants during the teleconference.

In some embodiments, the user device 120 or the meeting server(s) may obtain only the basic file(s) 126 for a user. For example, a user may select an operating mode in which only the basic file(s) 126 are being transmitted and emotional files 128 are not being transmitted. In this example, if a user subsequently selects an operating mode in which the emotion files 128 are to be used, the user device 120 or the meeting server(s) may fetch and store the emotion files 128.

When a videoconference/multimedia session begins and a user has indicated that the user's animated files are to be used as a source/transmitted instead of video (e.g., by muting video, selecting an option to transmit the animated files, etc.), the user's basic file(s) 126 may be played on a loop to other participants in the meeting. As described above, when the user is associated with more than one basic file 126, the basic files 126 may be played on a loop (e.g., in a random order) in place of video. When a user selects the operating mode in which the emotion files(s) 128 are to be used and a user reacts or displays an emotion, a user device 120-1 to 120-N or meeting server(s) 110 may receive a trigger indicating that a corresponding emotion file 128 is to be transmitted/displayed.

In some embodiments, the emotion/reaction may be triggered based on face detection and/or gesture detection. For example, a camera on the user's user device 120 may detect that the user is finding something amusing/funny by smiling or laughing or that the user is nodding in agreement to something that was said during the teleconference. Although the camera is not transmitting video of the user to meeting server(s) 110, the camera may still capture video of the user locally and may detect the user's gestures. The user may select an option in which the gesture/facial recognition is turned off (e.g., by selecting a mode in which the emotion files 128 are not transmitted, selecting an option to trigger an emotion file 128 using a reaction button, etc.). In other embodiments, the emotion/reaction may be triggered based on receiving an input from the user. For example, as discussed below with respect to FIG. 2, a user may select a reaction button from a videoconference interface to trigger the emotion/reaction.

When the emotion/reaction is triggered by the user, the user's user device 120 (or a videoconference client/application on the user device 120) transmits a signal to meeting server(s) 110 (e.g., when the animated files are stored at and transmitted by meeting server(s) 110) or to a local client/software (when the animated files are stored at and transmitted by user device 120) indicating that the emotion/reaction has been triggered. The signal includes a participant identifier (ID) associated with the user and an emotion ID associated with the reaction/emotion and the corresponding emotion file 128. When the signal is received (e.g., at meeting server(s) 110 or the local client/software at user device 120), the emotion file 128 corresponding to the user ID and the emotion ID is transmitted to the other participants in the teleconference for display playback on their user devices 120. In some embodiments, the emotion file 128 may be used as a source/transmitted at the conclusion of a current loop of a basic file 126. Since the basic file 126 and the emotion file 128 include a common start/stop expression for the user, using or transmitting the emotion file 128 when the basic file 126 concludes may provide a seamless transition between files. In other embodiments, the emotion file 128 may be used as a source or transmitted before a conclusion of the basic file 126. In this embodiment, the switch between the basic file 126 and the emotion file 128 may be more glitchy or unnatural, but the emotion/expression may be conveyed in a timelier manner. At the conclusion one or more loops of the emotion file 128, the basic file(s) 126 may be once again played on a loop until an additional emotion trigger is received for the user.

Figure 2:
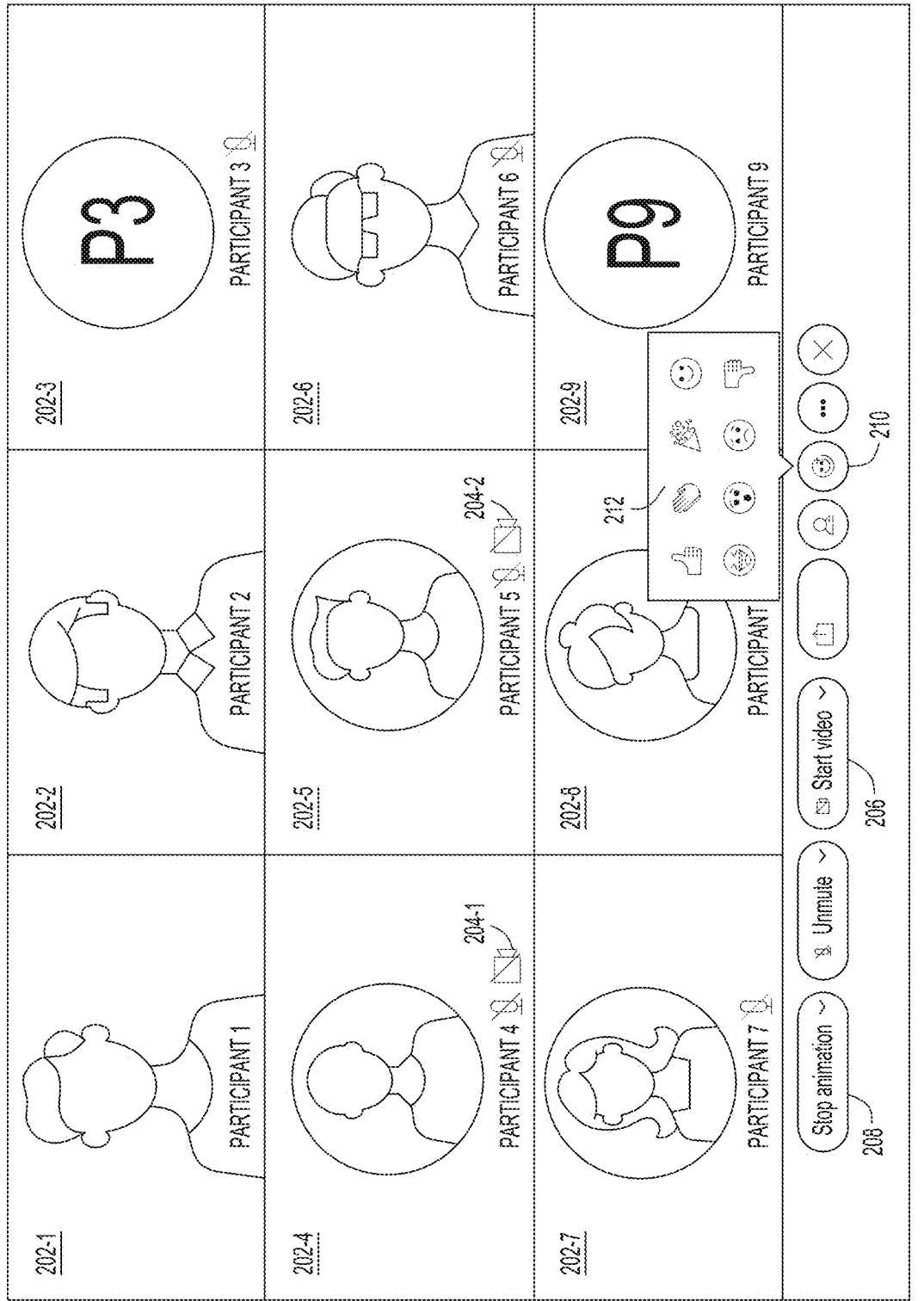
FIG. 2 illustrates an example user interface in which visual feedback for video muted participants is provided, according to an example embodiment.

Reference is now made to FIG. 2 with continued reference to FIG. 1. FIG. 2 illustrates an example user interface 200 in which animated files may be received as video for one or more participants in a videoconference/multimedia session. User interface 200 includes a grid view of feeds 202-1 to 202-9 associated with different participants.

As illustrated in FIG. 2, participants associated with feeds 202-1, 202-2, and 202-6 are displaying video and participants associated with feeds 202-3 and 202-9 are displaying initials with no video and no profile picture. Participants associated with feeds 202-4, 202-5, 202-7, and 202-8 are displaying profile pictures instead of transmitting video. In addition, feeds 202-4 and 202-5 include video muted indicators 204-1 and 204-2. Video muted indicators 204-1 and 204-2 may optionally be displayed when a user is transmitting animated files in the place of video. Since the animated files should not look like or be confused with a regular video participant, video muted indicators 204-1 and 204-2 may be displayed to ensure that the user is aware that the participants associated with feeds 202-4 and 202-5 are not transmitting live video. Feed 202-7 does not include a video muted indicator and, in this example, the user associated with feed 202-7 is displaying a picture and not using or transmitting animated files.

As illustrated in FIG. 2, the feeds 202-4 and 202-5 that are using animated files look like feed 202-6 that is displaying an image of the user except that the images in feeds 202-4 and 202-5 are animated instead of static. In practice, the profile pictures associated with feeds 202-4 and 202-5 would appear to make slight gestures and, optionally, react during the online meeting.

User interface 200 may additionally include button 206 to start or stop transmitting video. As illustrated in FIG. 2, the button 206 says "Start video," which indicates that the user's video is turned off. In some embodiments, a user may make a selection to indicate that animated files are to be used as a source/transmitted in place of video by default when the user's video is turned off or muted. In this embodiment, when button 206 indicates that the video is turned off, it will indicate to the user that the animated files are being used as a source/transmitted. To turn the video on and stop using or transmitting the animated files, the user may select button 206. In other embodiments, the user may select whether to use or transmit animated files when the video is turned off. In this embodiment, button 208, which indicates whether the animated files are being used or transmitted, may be displayed to the user. In the example, shown in FIG. 2, button 208 says "Stop animation," which indicates that the animated files are being used as a source/transmitted. To stop using or transmitting the animated files, the user may select button 208. When the user's video is off and the user has chosen to stop the animation, the user's profile picture, initials, or something else may be displayed in place of the animation. When the user's video is being transmitted, a user may not be able to select button 208. In some embodiments, user interface 200 may display buttons with additional options, such as an option to transmit only basic file(s) 126 (and not emotion files 128), an option to not allow the camera to detect emotions, etc.

In the example illustrated in FIG. 2, the user's video is turned off/muted. When a user wishes to trigger an emotion file 128 (e.g., when the user has selected an option to not allow the camera to perform facial/gesture recognition), the user may select button 210, which displays menu 212. Menu 212 displays graphics that represent different emotions/reactions. A user may select one of the graphics to trigger an emotion file 128 to be transmitted and displayed for playback. For example, the user may select the laughing face graphic to indicate that something is funny or amusing and an emotion file 128 showing the user laughing may be transmitted. In some embodiments, a user may provide emotions/reactions using menu 212 in addition to triggering emotions/reactions using face and gesture detection.

In some embodiments, triggering the emotion/reaction using menu 212 may draw more attention to the emotion/reaction than triggering the emotion/reaction using face or gesture recognition. For example, emotions/reactions selected from menu 212 may be associated with separate emotion files 128 for extreme or funny animations of the user laughing, clapping, wowing, etc. In some embodiments, prerecorded audio or stock audio may be played with the extreme or funny animation files. Use of the extreme or funny emotion animated files may be activated and deactivated by the user or a host of the videoconference.

By displaying animated files in place of profile pictures, even in the most basic mode, the grid view is more dynamic and provides a user with a feeling of participants being present in an online meeting or videoconference. In addition, by giving the users an option to provide emotions/reactions, a user may participate in a meeting nonverbally (e.g., by triggering agreement or amusement emotions/reactions) without displaying video. The emotion animated files may additionally give a speaker feedback regarding participants' emotions and reactions when the participants' audio and video are muted.

Figure 3:
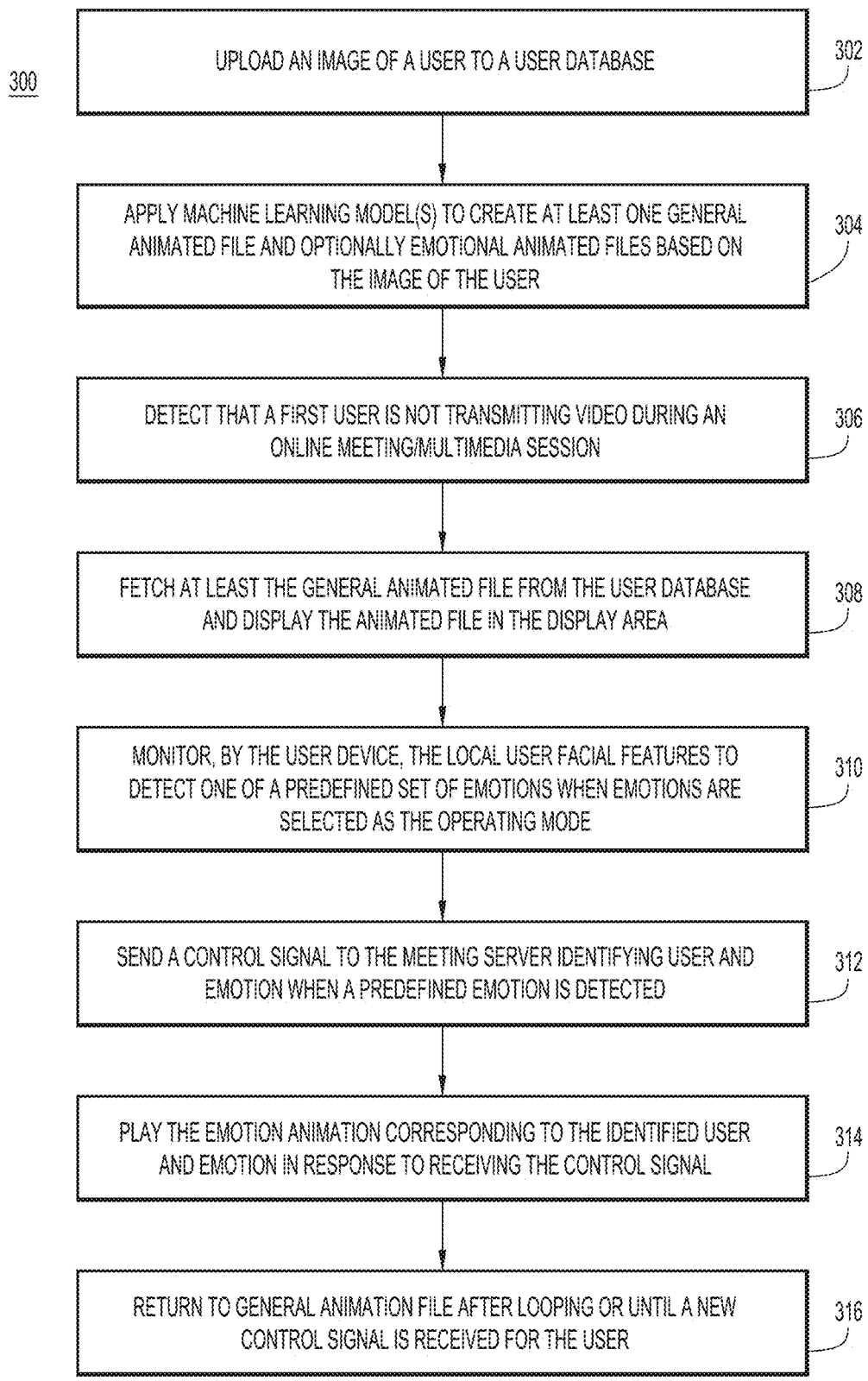
FIG. 3 is a flow diagram illustrating a method of providing visual feedback for video muted participants, according to an example embodiment.

Referring to FIG. 3, FIG. 3 is a flow chart of a method 300 for providing visual feedback for video muted participants of an online meeting/multimedia session, according to embodiments described herein. Method 300 may be performed by meeting server(s) 110 and/or user devices 120-1 to 120-N.

At 302, an image of a user may be uploaded to a user database. For example, a user or another person (e.g., an administrator) may upload an image/photograph as a profile picture or the image/photograph may be automatically uploaded from a directory or another source. At 304, one or more machine learning models may be applied to create at least one general/basic animated file and optionally several emotional animated files based on the image of the user. For example, ML models and/or AI technologies may be applied to the image/photograph of the user to create basic file(s) 126 in which the user moves slightly in a neutral manner. Optionally, emotion files 128 may additionally be created in which the user appears to perform gestures associated with different emotions/reactions (e.g., smiling, laughing, nodding, etc.). The basic file(s) 126 and optionally the emotion files 128 are stored to a user database, such as file store 124, a file store at user device 120, or another database.

At 306, it is detected that a first user is not transmitting video during an online meeting/multimedia session. For example, a user device 120 or meeting server(s) 110 may detect that a user is not transmitting video during an online meeting/multimedia session. The user may have selected an option to "mute" video, such as by pressing button 206 in FIG. 2.

At 308, at least the general/basic animated files are fetched from a user database and displayed in the display area. For example, user device 120 and/or meeting server(s) may obtain basic file(s) 126 for the user and transmit the basic file(s) 126 on a loop for display playback on user devices 120 of other participants in the online meeting/multimedia session. If one basic file 126 is obtained, the basic file 126 may be played on a loop. If more than one basic file 126 is obtained, the basic files 126 may be played on a loop (e.g., in a random order) to break any repetitive appearance.

At 310, the user device may monitor facial features/gestures of the local user to detect one of a predefined set of emotions when emotions are selected as the operating mode. For example, a user may select an option to allow emotion files 128 to be transmitted and to allow facial/gesture detection to be used. A camera of user device 120 may monitor the user's facial features/gestures and detect a particular predefined emotion/reaction (e.g., laughing, nodding, etc.) that corresponds to an emotion/gesture associated with an emotion file 128.

At 312, the user device may send a control signal to the meeting server identifying the user and the emotion when the predefined emotion is detected. For example, when the meeting server(s) 110 has obtained the basic file(s) 126 and the emotion files 128, user device 120 may transmit a control signal to meeting server(s) 110 when the predefined emotion has been detected. The control signal may include a user ID associated with a user and an emotion ID associated with the detected emotion.

At 314, the emotion animated file corresponding to the identified user and emotion is played in response to receiving the control signal. For example, meeting server(s) 110 may obtain the emotion file 128 corresponding to the user and the detected emotion and meeting server(s) 110 may transmit the emotion file 128 for display playback on the user devices 120 of other participants in the online meeting/multimedia session. In this way, the other users may receive visual feedback from the user when the user's camera is not turned on.

At 316, the general animation file is once again transmitted after looping or until a new control signal is received for the user. For example, after the emotion file 128 is played one or more times on a loop, the basic file(s) 126 are once again transmitted for the user. The basic file(s) may continue to be played on a loop until a new control signal is received for the user (e.g., in response to detecting an emotion/reaction corresponding to an emotion file 128, receiving an input associated with an emotion file 128, etc.).

Figure 4:
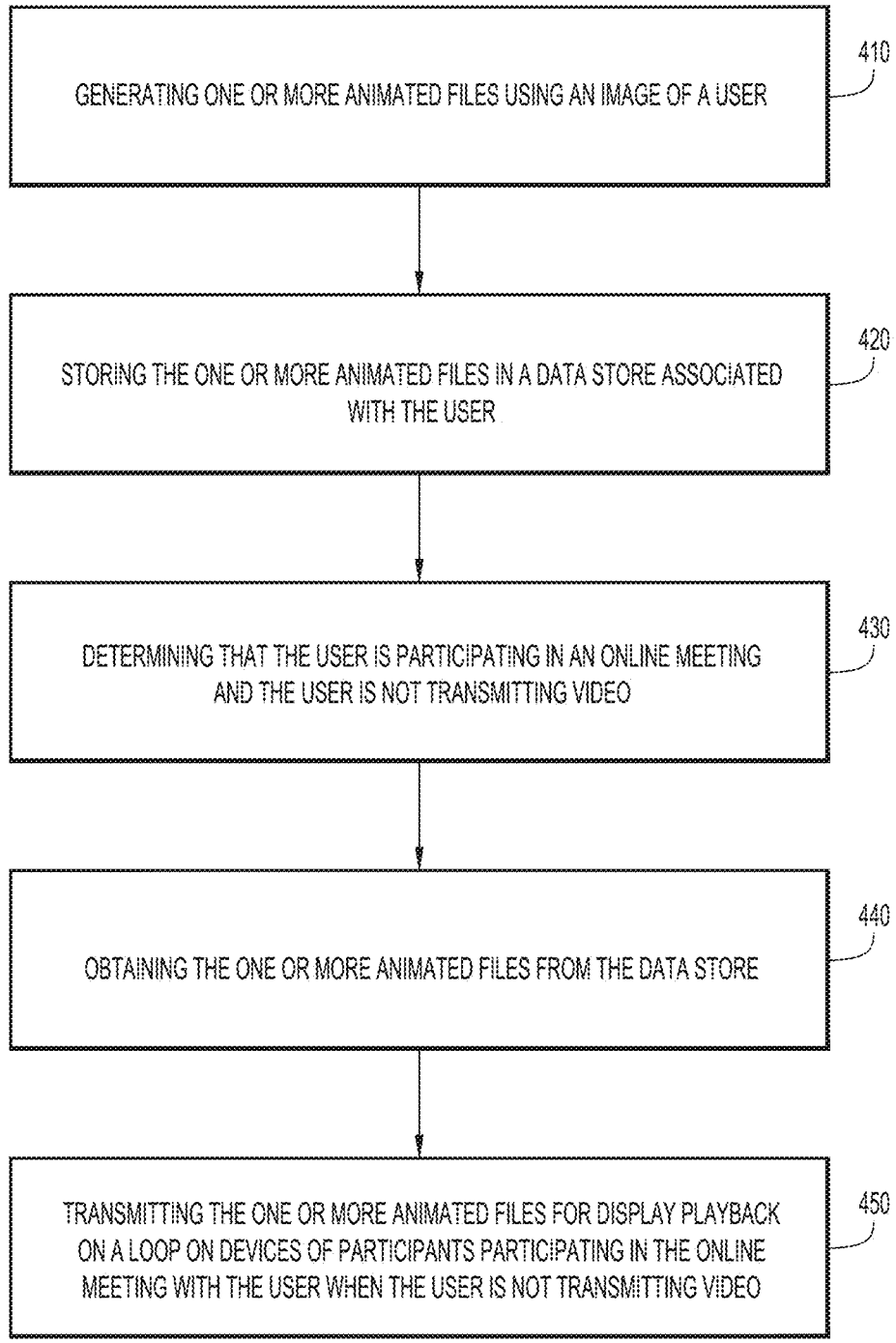
FIG. 4 is a flow diagram illustrating another method of providing visual feedback for video muted participants, according to an example embodiment.

Referring to FIG. 4, FIG. 4 is a flow diagram of a method 400 for providing visual feedback for video muted participants of an online meeting/multimedia session, according to embodiments described herein. Method 400 may be performed by meeting server(s) 110 and/or user devices 120-1 to 120-N.

At 410, one or more animated files are generated using an image of a user. For example, one or more ML models may be applied to an image/photograph of a user to generate one or more animated files. At 420, the one or more animated files are stored in a data store associated with the user. For example, the one or more animated files may be stored at a cloud, such as in file store 124 at cloud 140 of FIG. 1, at a data store at the user's user device (such as user device 120-1), or in a different location.

At 430, it is determined that the user is participating in an online meeting and the user is not transmitting video. For example, the user may be participating in an online meeting with other participants and the user may have made a selection indicating that the video is "muted" or that animated files are to be used in place of video. User device 120-1 or meeting server(s) 110 may determine that the user is not transmitting video based on the user's selection.

At 440, one or more animated files may be obtained from the data store. For example, meeting server(s), user device 120-1, or another device may obtain the one or more animated files associated with the user from the data store. At 450, the one or more animated files are transmitted for display playback on a loop on devices of participants participating in the online meeting with the user when the user is not transmitting video. For example, meeting server(s) 110 or user device 120-1 may transmit the one or more animated files for display playback on a loop on user devices 120-2 to 120-N.

Figure 5:
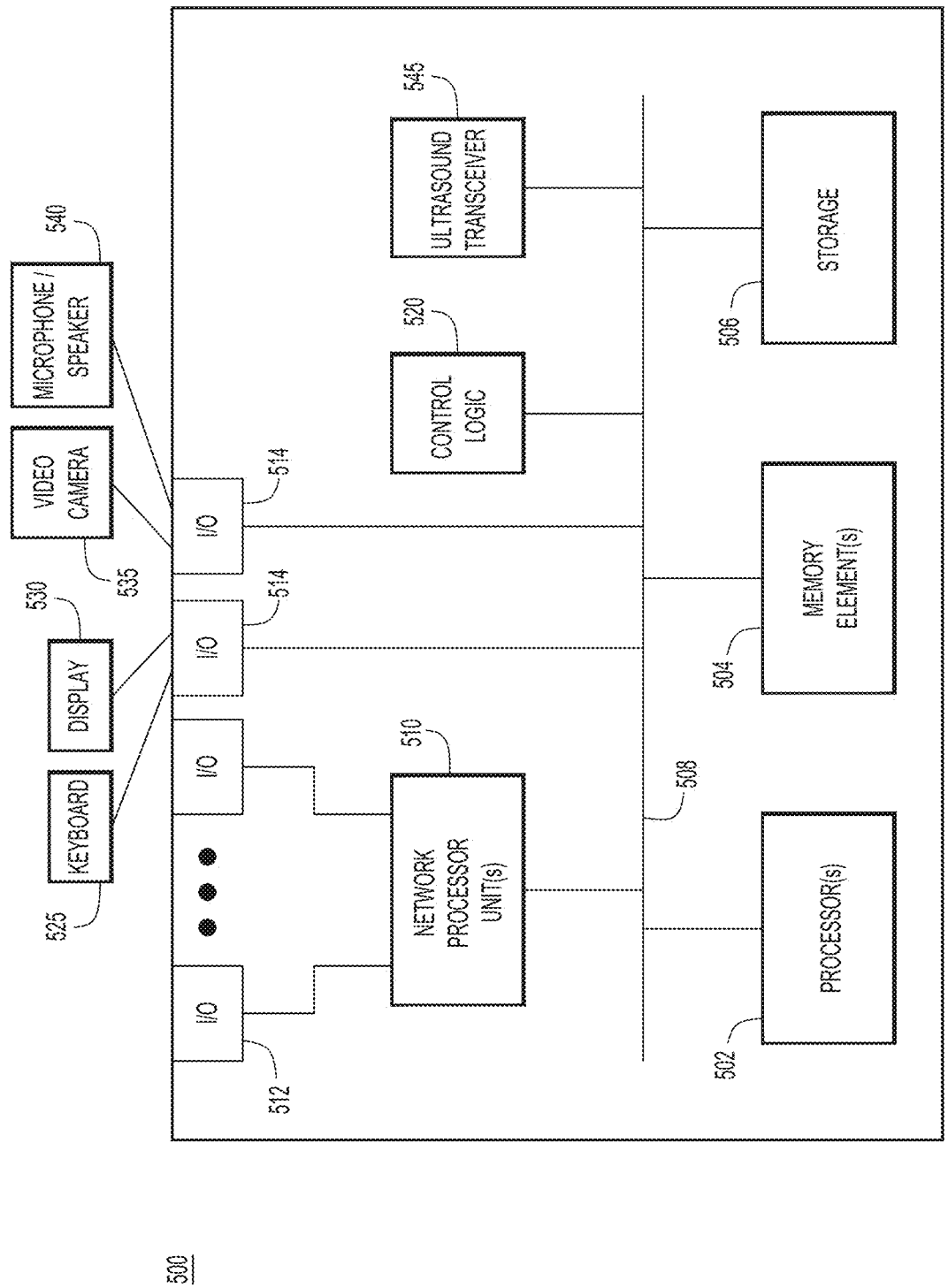
FIG. 5 is a hardware block diagram of a device that may be configured to perform the endpoint-based operations involved in providing visual feedback for video muted participants, according to an example embodiment.

Referring to FIG. 5, FIG. 5 illustrates a hardware block diagram of a computing/computer device 500 that may perform functions of a user device associated with operations discussed herein in connection with the techniques depicted in FIGS. 1-4. In various embodiments, a computing device, such as computing device 500 or any combination of computing devices 500, may be configured as any devices as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard 525, keypad, a touch screen, and/or any other suitable input and/or output device now known or hereafter developed. This may be the case, in particular, when the computer device 500 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 530 shown in FIG. 5, particularly when the computer device 500 serves as a user device as described herein. Display 530 may have touch-screen display capabilities. Additional external devices may include a video camera 535 and microphone/speaker combination 540. In addition, the computing device 500 may further include an ultrasound transceiver 545 that may be used for the various purposes described herein.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element (s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 6:
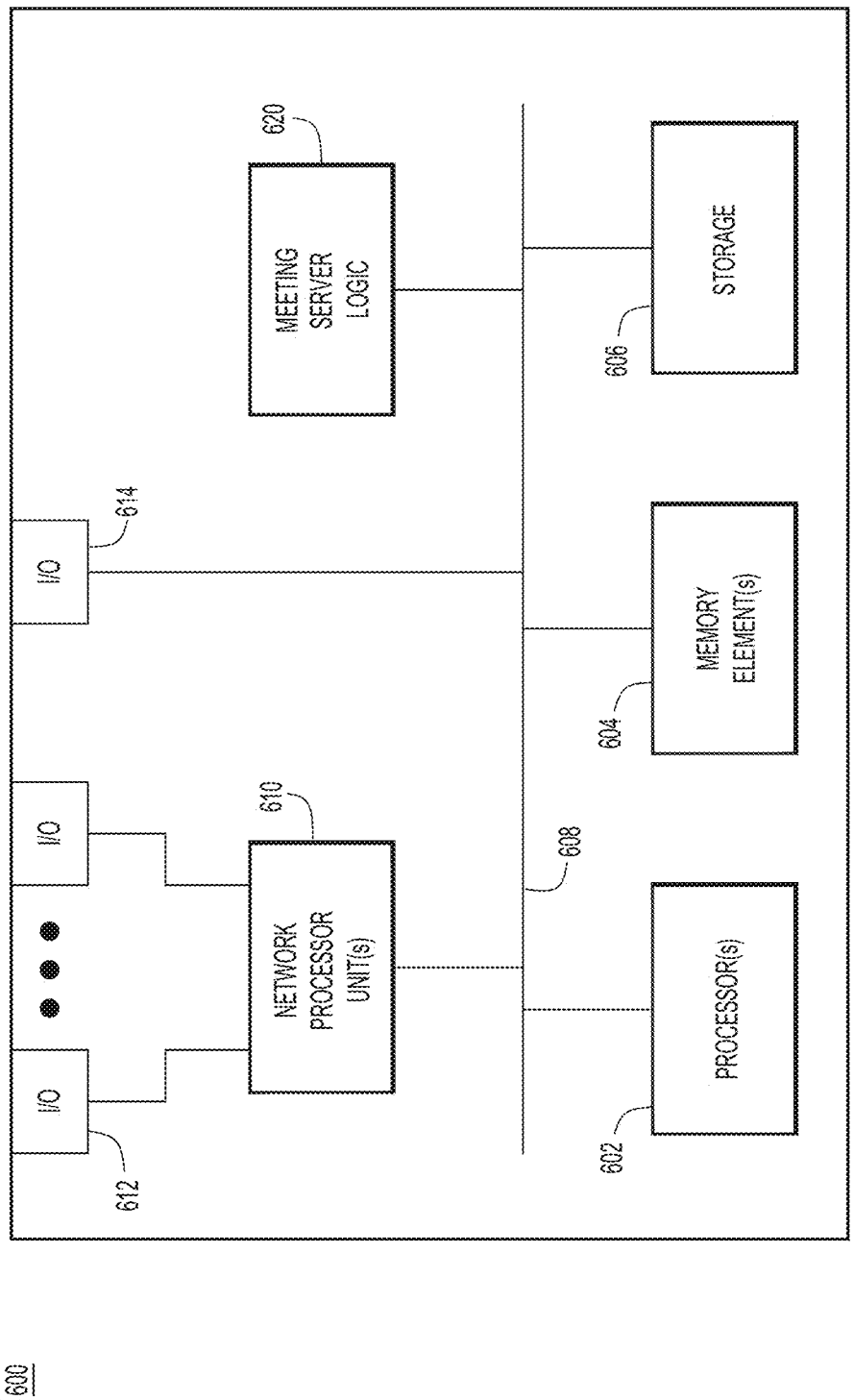
FIG. 6 is a hardware diagram of a computer device that may be configured to perform the meeting server operations involved in providing visual feedback for video muted participants, according to an example embodiment.

FIG. 6 illustrates a block diagram of a computing device 600 that may perform the functions of the meeting server(s) 110 described herein. The computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and meeting server logic 620. In various embodiments, instructions associated with the meeting server logic 620 is configured to perform the meeting server operations described herein, including those depicted by the flow charts for method 300 shown in FIG. 3 and method 400 shown in FIG. 4.

In one form, a computer-implemented method is provided comprising: generating one or more animated files using an image of a user; storing the one or more animated files in a data store associated with the user; determining that the user is participating in an online meeting and the user is not transmitting video; obtaining the one or more animated files from the data store; and transmitting the one or more animated files for display playback on a loop on devices of participants participating in the online meeting with the user when the user is not transmitting video.

In one example, the one or more animated files includes a plurality of emotion animated files and the method further comprises: obtaining a trigger corresponding to a particular emotion associated with the user; and transmitting, for display on the devices of the participants, a particular emotion animated file, of the plurality of emotion animated files, corresponding to the particular emotion. In another example, the plurality of emotion animated files includes one or more of a smiling file, a laughing file, and a nodding file. In another example, obtaining the trigger includes obtaining an indication of the particular emotion using face detection or gesture detection. In another example, obtaining the trigger includes obtaining an indication that the user has selected a reaction button.

In another example, transmitting the particular emotion animated file comprises: obtaining a user identifier for the user associated with the particular emotion and an emotion identifier associated with the particular emotion animated file corresponding to the particular emotion; identifying the particular emotion animated file based on the emotion identifier and the user identifier; and transmitting the particular emotion animated file associated with the user identifier. In another example, the method further comprises transmitting the one or more animated files on the loop when the particular emotion animated file concludes. In another example, the image of the user includes a photographic image of the user and the one or more animated files include artificial intelligence models in which a head or facial features of the user in the photographic image move. In another example, the image of the user in the one or more animated files has a common expression at a beginning and a conclusion of the one or more animated files.

In another form, an apparatus is provided comprising: a memory; a network interface configured to enable network communication; and a processor, wherein the processor is configured to perform operations comprising: generating one or more animated files using an image of a user; storing the one or more animated files in a data store associated with the user; determining that the user is participating in an online meeting and the user is not transmitting video; obtaining the one or more animated files from the data store;

and transmitting the one or more animated files for display playback on a loop on devices of participants participating in the online meeting with the user when the user is not transmitting video.

In yet another form, one or more non-transitory computer readable storage media is provided. The one or more non-transitory computer readable storage media is encoded with instructions that, when executed by a processor of a user device, cause the processor to execute a method comprising: generating one or more animated files using an image of a user; storing the one or more animated files in a data store associated with the user; determining that the user is participating in an online meeting and the user is not transmitting video; obtaining the one or more animated files from the data store; and transmitting the one or more animated files for display playback on a loop on devices of participants participating in the online meeting with the user when the user is not transmitting video.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   generating a plurality of animated files using an image of a user, the plurality of animated files being video representations of the user that are created using the image of the user, the plurality of animated files including one or more basic animated files and one or more emotion animated files, each emotion animated file being associated with an emotion;
   storing the plurality of animated files in a data store associated with the user;
   determining that the user is participating in an online meeting and the user is not transmitting video;
   obtaining at least one basic animated file, of the one or more basic animated files, and at least one emotion animated file, of the one or more emotion animated files, from the data store;
   transmitting the at least one basic animated file for display playback on a loop on devices of participants participating in the online meeting with the user when the user is not transmitting video;
   obtaining a trigger corresponding to a particular emotion associated with the user;
   transmitting, for display playback on the devices of the participants, a particular emotion animated file, of the at least one emotion animated file, corresponding to the particular emotion, wherein the image of the user has a common expression at a beginning and a conclusion of the at least one basic animated file and the particular emotion animated file; and
   transmitting the at least one basic animated file for display playback on the loop when the particular emotion animated file concludes.

2. The computer-implemented method of claim 1, wherein the one or more emotion animated files includes one or more of a smiling file, a laughing file, and a nodding file.

3. The computer-implemented method of claim 1, wherein obtaining the trigger includes obtaining an indication of the particular emotion using face detection or gesture detection.

4. The computer-implemented method of claim 1, wherein obtaining the trigger includes obtaining an indication that the user has selected a reaction button.

5. The computer-implemented method of claim 1, wherein transmitting the particular emotion animated file comprises:
   obtaining a user identifier for the user associated with the particular emotion and an emotion identifier associated with the particular emotion animated file corresponding to the particular emotion;
   identifying the particular emotion animated file based on the emotion identifier and the user identifier; and
   transmitting the particular emotion animated file associated with the user identifier.

6. The computer-implemented method of claim 1, wherein the image of the user includes a photographic image of the user and the plurality of animated files include artificial intelligence models in which a head or facial features of the user in the photographic image move.

7. An apparatus comprising:
   a memory;
   a network interface configured to enable network communication; and
   a processor, wherein the processor is configured to perform operations comprising:
      generating a plurality of animated files using an image of a user, the plurality of animated files being video representations of the user that are created using the image of the user, the plurality of animated files including one or more basic animated files and one or more emotion animated files, each emotion animated file being associated with an emotion;
      storing the plurality of animated files in a data store associated with the user;
      determining that the user is participating in an online meeting and the user is not transmitting video;
      obtaining at least one basic animated file, of the one or more basic animated files, and at least one emotion animated file, of the one or more emotion plurality of animated files, from the data store;
      transmitting the at least one basic animated file for display playback on a loop on devices of participants participating in the online meeting with the user when the user is not transmitting video;
      obtaining a trigger corresponding to a particular emotion associated with the user;
      transmitting, for display playback on the devices of the participants, a particular emotion animated file, of the at least one emotion animated file, corresponding to the particular emotion, wherein the image of the user has a common expression at a beginning and a conclusion of the at least one basic animated file and the particular emotion animated file; and
      transmitting the at least one basic animated file for display playback on the loop when the particular emotion animated file concludes.

8. The apparatus of claim 7, wherein the processor is configured to perform the operation of obtaining the trigger by obtaining an indication of the particular emotion using face detection or gesture detection.

9. The apparatus of claim 7, wherein the processor is configured to perform the operation of obtaining the trigger by obtaining an indication that the user has selected a reaction button.

10. The apparatus of claim 7, wherein the processor is configured to perform the operation of transmitting the particular emotion animated file by:

obtaining a user identifier for the user associated with the particular emotion and an emotion identifier associated with the particular emotion animated file corresponding to the particular emotion;

identifying the particular emotion animated file based on the emotion identifier and the user identifier; and transmitting the particular emotion animated file associated with the user identifier.

11. The apparatus of claim 7, wherein the image of the user includes a photographic image of the user and the plurality of animated files include artificial intelligence models in which a head or facial features of the user in the photographic image move.

12. One or more non-transitory computer readable storage media encoded with instructions that, when executed by a processor of a user device, cause the processor to execute a method comprising:

generating a plurality of animated files using an image of a user, the plurality of animated files being video representations of the user that are created using the image of the user, the plurality of animated files including one or more basic animated files and one or more emotion animated files, each emotion animated file being associated with an emotion;

storing the plurality of animated files in a data store associated with the user;

determining that the user is participating in an online meeting and the user is not transmitting video;

obtaining at least one basic animated file, of the one or more basic animated files and at least one emotion animated file, of the one or more emotion animated files, from the data store;

transmitting the at least one basic animated file for display playback on a loop on devices of participants participating in the online meeting with the user when the user is not transmitting video;

obtaining a trigger corresponding to a particular emotion associated with the user;

transmitting, for display playback on the devices of the participants, a particular emotion animated file, of the at least one emotion animated file, corresponding to the particular emotion, wherein the image of the user has a common expression at a beginning and a conclusion of the at least one basic animated file and the particular emotion animated file; and transmitting the at least one basic animated file for display playback on the loop when the particular emotion animated file concludes.

13. The one or more non-transitory computer readable storage media of claim 12, wherein obtaining the trigger includes obtaining an indication of the particular emotion using face detection or gesture detection.

14. The one or more non-transitory computer readable storage media of claim 12, wherein obtaining the trigger includes obtaining an indication that the user has selected a reaction button.

15. The one or more non-transitory computer readable storage media of claim 12, wherein transmitting the particular emotion animated file comprises:

obtaining a user identifier for the user associated with the particular emotion and an emotion identifier associated with the particular emotion animated file corresponding to the particular emotion;

identifying the particular emotion animated file based on the emotion identifier and the user identifier; and transmitting the particular emotion animated file associated with the user identifier.

16. The computer-implemented method of claim 1, further comprising determining that the user has selected an operating mode in which the one or more emotion animated files are to be used.

17. The apparatus of claim 7, wherein the one or more emotion animated files includes one or more of a smiling file, a laughing file, and a nodding file.

18. The apparatus of claim 7, wherein the processor is further configured to perform the operation of determining that the user has selected an operating mode in which the one or more emotion animated files are to be used.

19. The one or more non-transitory computer readable storage media of claim 12, wherein the one or more emotion animated files includes one or more of a smiling file, a laughing file, and a nodding file.

20. The one or more non-transitory computer readable storage media of claim 12, further comprising determining that the user has selected an operating mode in which the one or more emotion animated files are to be used.

* * * * *

UNITED STATES PATENT AND TRADEMARK OFFICE
CERTIFICATE OF CORRECTION

Page 1 of 1

PATENT NO. : 12,407,791 B2
APPLICATION NO. : 17/942457
DATED : September 2, 2025
INVENTOR(S) : Cato Nyberg It is certified that error appears in the above-identified patent and that said Letters Patent is hereby corrected as shown below:

In the Claims

Claim 7, Column 16, Lines 39-40, please replace "emotion plurality of animated files," with --emotion animated files,--

Signed and Sealed this
Second Day of December, 2025

John A. Squires
*Director of the United States Patent and Trademark Office*